(12) United States Patent
Brockie et al.

(10) Patent No.: US 8,902,534 B2
(45) Date of Patent: Dec. 2, 2014

(54) IMPLEMENTING TRACK FOLLOWING USING DATA CHARACTERISTICS FOR POSITIONAL INFORMATION

(75) Inventors: Richard Michael Brockie, Los Gatos, CA (US); Richard Leo Galbraith, Rochester, MN (US); Petrus Antonius Van Der Heijden, Cupertino, CA (US); Roger William Wood, Gilroy, CA (US)

(73) Assignee: HGST Netherlands B.V., Amsterdam (NL)

( * ) Notice: Subject to any disclaimer, the term of this patent is extended or adjusted under 35 U.S.C. 154(b) by 124 days.

(21) Appl. No.: 13/566,772

(22) Filed: Aug. 3, 2012

(65) Prior Publication Data

US 2014/0036381 A1 Feb. 6, 2014

(51) Int. Cl.
*G11B 21/02* (2006.01)

(52) U.S. Cl.
USPC .................. 360/75; 360/31; 360/48; 360/53; 360/77.02

(58) Field of Classification Search
None
See application file for complete search history.

(56) References Cited

U.S. PATENT DOCUMENTS

| | | | |
|---|---|---|---|
| 6,185,063 B1 * | 2/2001 | Cameron | 360/78.04 |
| 7,729,071 B2 * | 6/2010 | Harada | 360/39 |
| 7,965,465 B2 * | 6/2011 | Sanvido et al. | 360/60 |
| 7,982,994 B1 * | 7/2011 | Erden et al. | 360/55 |
| 8,094,403 B2 | 1/2012 | Wood et al. | |
| 8,300,341 B2 * | 10/2012 | Itakura et al. | 360/48 |
| 8,638,513 B1 * | 1/2014 | Burd | 360/39 |
| 8,665,545 B2 * | 3/2014 | Coker et al. | 360/53 |
| 8,724,242 B2 * | 5/2014 | Gao | 360/31 |
| 2007/0236818 A1 * | 10/2007 | Emo et al. | 360/60 |
| 2011/0181978 A1 * | 7/2011 | Rub | 360/55 |
| 2012/0162806 A1 * | 6/2012 | Champion et al. | 360/53 |
| 2012/0300341 A1 * | 11/2012 | Matsuo et al. | 360/77.02 |
| 2012/0307400 A1 * | 12/2012 | Kawabe | 360/77.01 |
| 2013/0021689 A1 * | 1/2013 | Haratsch et al. | 360/45 |

OTHER PUBLICATIONS

"The Feasibility of Magnetic Recording at 10 Terabits Per Square Inch on Conventional Media" by Roger Wood et al., IEEE Transactions on Magnetics, vol. 45, No. 2, Feb. 2009.

* cited by examiner

*Primary Examiner* — Dismery Mercedes
(74) *Attorney, Agent, or Firm* — Joan Pennington (57) ABSTRACT

A method, apparatus and a data storage device are provided for implementing track following and data recovery with readback of shingled data written in overlapping shingled data tracks on a recordable surface of a storage device. Positional information is identified with data readback of shingled data written in overlapping shingled data tracks. The identified positional information is used to selectively modify at least one predefined channel parameter, for example, to provide enhanced track following and enhanced data recovery.

20 Claims, 9 Drawing Sheets

IMPLEMENTING TRACK FOLLOWING USING DATA CHARACTERISTICS FOR POSITIONAL INFORMATION

FIELD OF THE INVENTION

The present invention relates generally to the data storage field, and more particularly, relates to a method, apparatus and a data storage device for implementing track following and data recovery with readback of shingled data written in overlapping shingled data tracks on a recordable surface of a storage device.

DESCRIPTION OF THE RELATED ART

Many data processing applications require long-term data storage and typically a high-degree of data integrity. Typically these needs are met by non-volatile data storage devices.

Non-volatile storage or persistent media can be provided by a variety of devices, most commonly, by direct access storage devices (DASDs), which also are referred to as hard disk drives (HDDs).

The hard disk drives (HDDs) advantageously include Shingled Disk Drives (SDDs) to achieve high track density. A Shingled Disk Drive (SDD) is a hard disk drive recording magnetic patterns of data on a writable disk surface in overlapping circular tracks using shingled magnetic recording (SMR), also referred to as a SMR drive.

A need exists for an enhanced effective and efficient mechanism to implement track following and data recovery with readback of shingled data written in overlapping shingled data tracks on a recordable surface of a storage device.

SUMMARY OF EMBODIMENTS OF THE INVENTION

Aspects of the present invention are to provide a method, apparatus and a data storage device for implementing track following and data recovery with readback of shingled data written in overlapping shingled data tracks on a recordable surface of a storage device. Other important aspects of the present invention are to provide such method, apparatus and data storage device substantially without negative effect and to overcome some of the disadvantages of prior art arrangements.

In brief, a method, apparatus and a data storage device are provided for implementing track following and data recovery with readback of shingled data written in overlapping shingled data tracks on a recordable surface of a storage device. Positional information is identified with data readback of shingled data written in overlapping shingled data tracks. The identified positional information is used to selectively modify at least one predefined channel parameter, for example, to provide enhanced track following and enhanced data recovery.

BRIEF DESCRIPTION OF THE DRAWINGS

The present invention together with the above aspects, features, and advantages may best be understood from the following detailed description of the embodiments of the invention illustrated in the drawings, wherein.

DETAILED DESCRIPTION OF THE EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

In accordance with features of the embodiments of the invention, a method, apparatus and a data storage device are provided for implementing track following and data recovery with readback of shingled data written in overlapping shingled data tracks on a recordable surface of a storage device.

Figure 1:
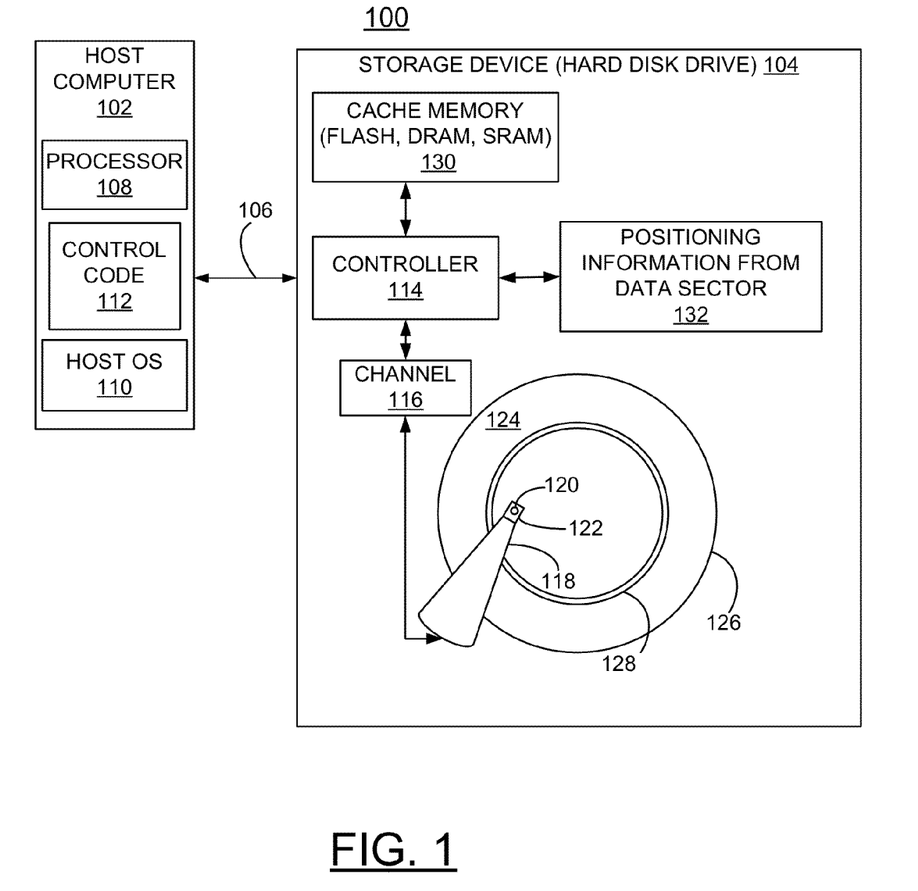
FIG. 1 is a block diagram representation illustrating a system for implementing track following and data recovery with readback of shingled data written in overlapping shingled data tracks on a recordable surface of a storage device in accordance with an embodiment of the invention.

Having reference now to the drawings, in FIG. 1, there is shown an example system generally designated by the reference character 100 for implementing track following and data recovery with readback of shingled data written in overlapping shingled data tracks on a recordable surface of a storage device in accordance with an embodiment of the invention. System 100 includes a host computer 102, a storage device 104, such as a hard disk drive 104, and an interface 106 between the host computer 102 and the storage device 104.

As shown in FIG. 1, host computer 102 includes a processor 108, a host operating system 110, and control code 112. The storage device or hard disk drive 104 includes a controller 114 coupled to a data channel 116. The storage device or hard disk drive 104 includes an arm 118 carrying a read/write head including a read element 120, and a write element 122.

In operation, host operating system 110 in host computer 102 sends commands to hard disk drive 104. In response to the commands, hard disk drive 104 performs requested functions such as reading data, writing data, erasing data, and the like, on disk surface 124. The write element 122 writes magnetic patterns of data on a recordable or writable surface 124 of a disk 126. According to some embodiments of the present invention, controller circuit 114 causes write element 122 to record magnetic patterns of data on a writable surface of disk 122 in overlapping circular tracks 128 using shingled writing. System 100 includes a cache memory 130, for example, implemented with one or a combination of a flash memory, a dynamic random access memory (DRAM) and a static random access memory (SRAM). System 100 includes positioning information 132 from a shingled data sector applied to the controller 114 in accordance with an embodiment of the invention.

Controller 114 can include various implementations, for example, fabricated with one or multiple integrated circuit dies. A digital video recorder (DVR), a set-top-box (STB), or various other computer system types are specific implementation of a host computer 102. While the control code 112 is shown in the host computer 102, and the controller 114 is shown in the hard disk drive 104, the control code 112 may reside in any suitable location, such as the hard disk drive 104 separate from host computer 102 and controller circuit 114 may reside in any suitable location, separate from hard disk drive 104, for example, in the host computer 102, and the like.

System 100 including the host computer 102 and the storage device or hard disk drive 104 is shown in simplified form sufficient for understanding the present invention. The illustrated host computer 102 together with the storage device or hard disk drive 104 is not intended to imply architectural or functional limitations. The present invention can be used with various hardware implementations and systems and various other internal hardware devices.

Figure 2A:
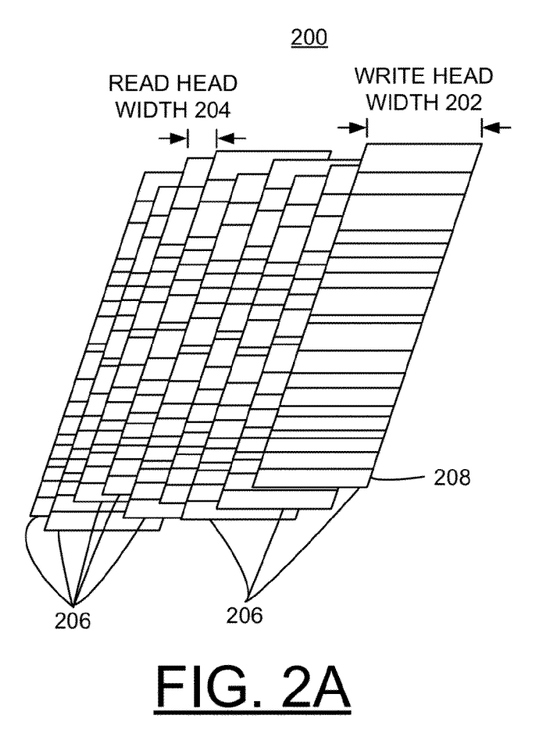
FIGS. 2A and 2B schematically illustrate not to scale an example block of shingled writing in a storage device of the system of FIG. 1 in accordance with an embodiment of the invention.
Figure 2B:
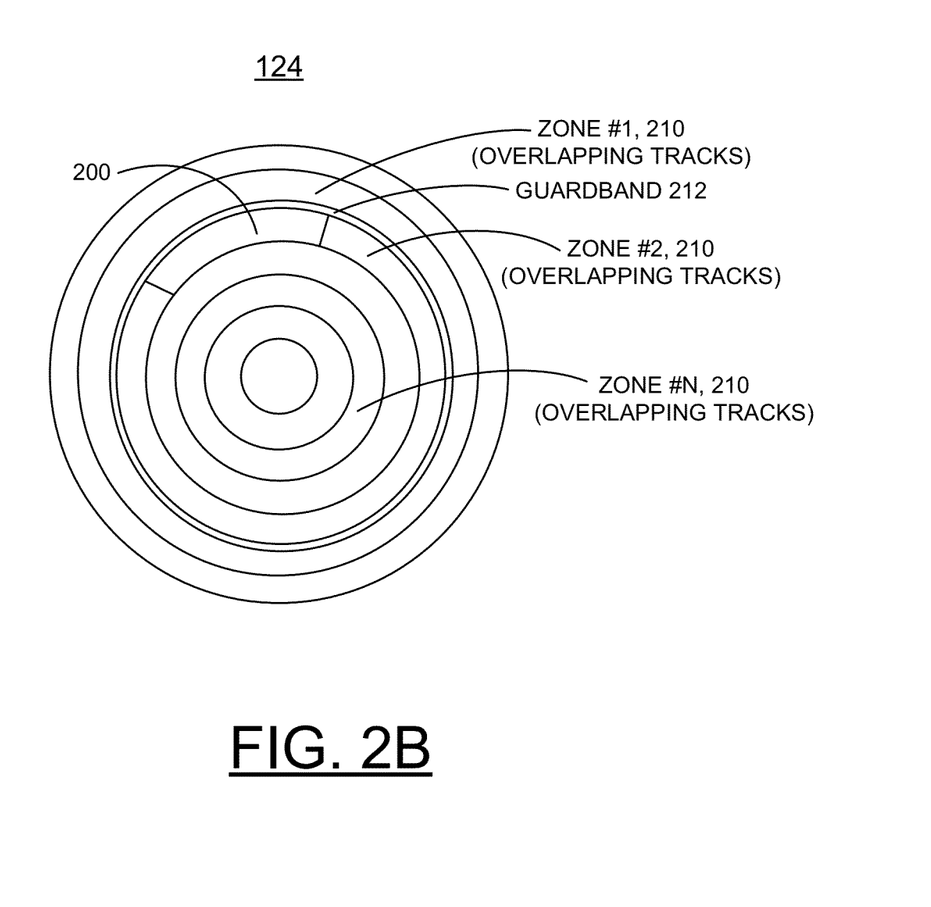

With shingled writing, zones including tracks 128 of the hard disk drive 104 are written in sequence and overlayed, such as roof shingles, such as zones 210 illustrated in FIGS. 2A, and 2B, to write data onto magnetically writable surfaces. Adjacent tracks that are written onto a magnetic hard disk using shingled writing principles overlap each other on the writable surface 124 of the hard disk 126. By overlapping tracks of data, typically much higher track density can be achieved. However, a track of data stored on the writable surface of a magnetic hard disk using shingled writing principles cannot be overwritten without erasing data stored on other tracks that the track to be written overlays.

FIGS. 2A and 2B schematically illustrate not to scale an example block 200 of shingled writing in a storage device, or hard disk drive 104 of the system 100 in accordance with an embodiment of the invention.

As shown in FIG. 2A, the write head width 202 is much wider, for example, approximately three times wider, than the width of final data tracks, and the read head width 204 is sufficiently narrow so as to read back data from only one trimmed track at a time. The data block 200 includes a plurality of overlapping data tracks 206. Each of the tracks 206 contains several sectors. Each sector contains several bytes of data. An example of a sector 208 is shown. The data block 200 includes a plurality of or a set of overlapping sectors 208, such as one or more sectors in length.

FIG. 2B illustrates not to scale a plurality of zones #1-#N, 210, with a guardband 212 shown between the zones #1-#2, 210. Each of the plurality of zones #1-#N, 210 includes a plurality of overlapping tracks, not separately shown in FIG. 2B. The particular number of the plurality of tracks included in the zones 210 is related to the width of the write head 122. The guardband 212 illustrated between the plurality of zones #1-#N, 210 is provided so that writing to a last track in a zone 210 does not interfere with writing to a next zone.

For shingled written drives of the embodiments of the invention, writes are performed on sectors within a respective zone 210; typically each zone 210 includes a number of tracks containing many individual sectors 208. For shingled written drives, the reads are performed on single sectors. In contrast, for non-shingled drives, read and writes are done on individual sectors.

In accordance with features of the embodiments of the invention, in shingled magnetic recorded (SMR) data tracks, each new consecutive track partially overwrites the magnetic pattern of the previous track. This compares with regular perpendicular magnetic recording (PMR) where the tracks are not overlapped and results in a general symmetry of signal properties around the track center. In SMR the result is a generally J shape for the tracks, as illustrated and described with respect to FIG. 3. Thus, the readback signal about the resulting shingled track center is asymmetric. For example, the fringe field will be more pronounced at the non-shingled cross-track edge of the data track, and readback at the shingled cross-track edge of the data track will have less fringe noise.

Figure 3:
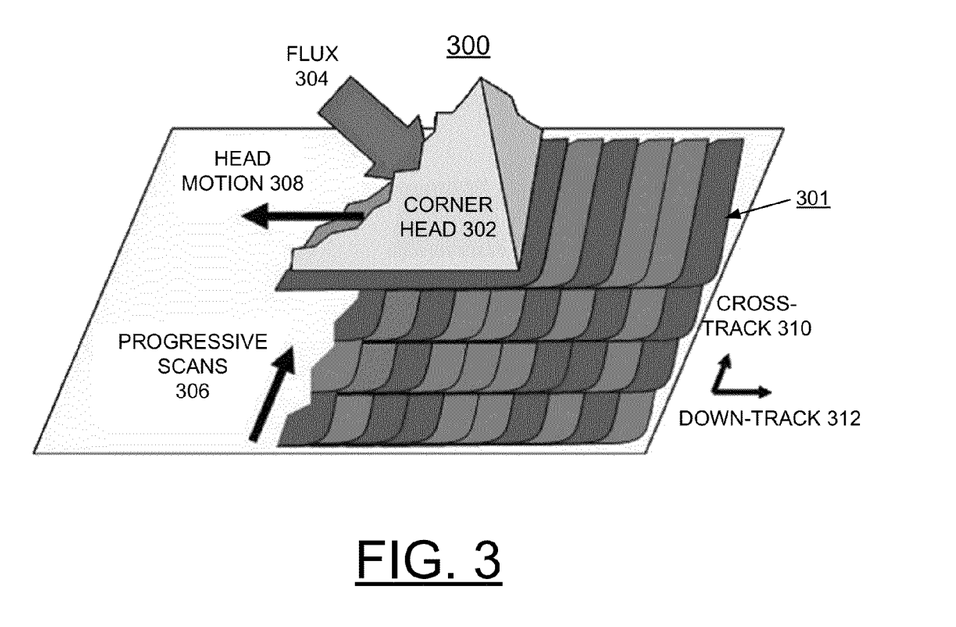
FIG. 3 schematically illustrates a shingled writing process in a storage device of the system of FIG. 1 in accordance with an embodiment of the invention.

Referring to FIG. 3, there is shown an example shingled writing process generally designated by the reference character 300 in accordance with an embodiment of the invention. As shown in FIG. 3, the shingled writing process 300 results in generally J shape tracks 301 using the magnetic recording head write element corner 302 (contained within write head element 122 of FIG. 4) writing data to a plurality of shingled tracks 301. The magnetic recording head write element 122 uses a head corner 302 to generate the magnetic write field indicated by FLUX 304 with progressive scans indicated by 306, head motion indicated by 308, cross-track indicated by 310 and down-track indicated by 312.

Figure 4:
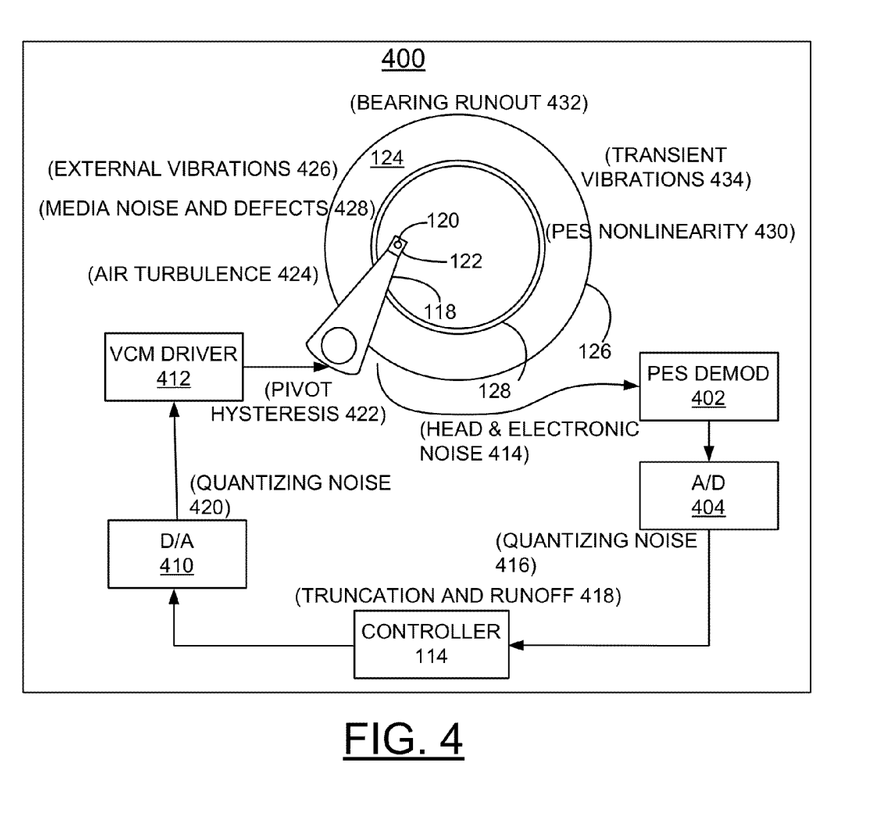
FIG. 4 schematically illustrates an example servo system including example noise and disturbances in a shingled writing process in a storage device of the system of FIG. 1 in accordance with an embodiment of the invention.

Referring to FIG. 4 there is shown an example servo system generally designated by the reference character 400 including example noise and disturbances in a shingled writing process in the storage device 104 of the system 100 of FIG. 1 in accordance with an embodiment of the invention. Servo system 400 includes a position error signal (PES) demodulator 402 receiving a servo readback signal coupled to an analog-to-digital (A/D) converter 404 coupled to a controller, such as the controller 114 in FIG. 1. The controller 114 provides a control input to a digital-to-analog (D/A) converter 410 coupled to a voice coil motor (VCM) driver 412 coupled to the arm 118 carrying the read/write head including the read element 120, and the write element 122. As shown, the example noise and disturbances include head and electronic noise 414 coupled to the PES demodulator 402, quantizing noise 416 from the A/D 404, truncating and runoff 418 with the controller 114, quantizing noise 420 from the D/A 410, pivot hysteresis 422 from the VCM driver 412. Additional noise and disturbances in the storage device 104 include external vibrations 426, media noise and defects 428, PES nonlinearity 430, bearing runout 432, and transient vibrations 424.

Figure 5:
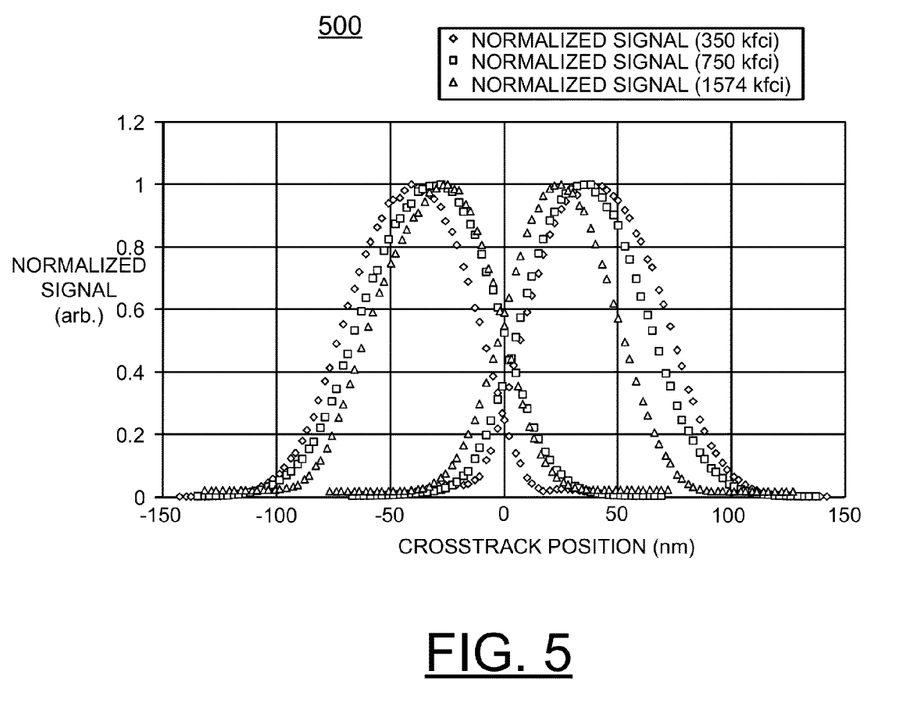
FIGS. 5 and 6 are charts respectively illustrating example signals (and example crosstrack signal shift) and noise mix (and example crosstrack noise mix change) of a shingled writing process in a storage device of the system of FIG. 1 in accordance with an embodiment of the invention.
Figure 6:
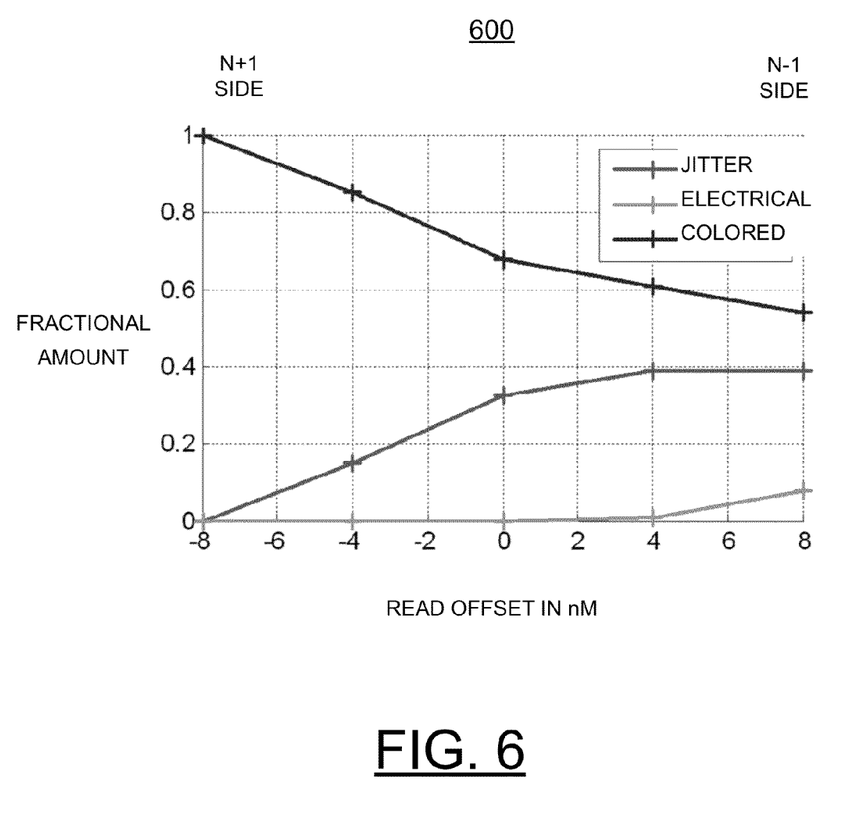

FIGS. 5 and 6 are charts respectively illustrating example displacement of track centers when shingling signals generally designated by the reference character 500 and example asymmetric cross-track noise mix generally designated by the reference character 600 of a shingled writing process in the SMR storage device 104 of the system 100 in accordance with an embodiment of the invention.

In accordance with features of the embodiments of the invention, in SMR, the readback signal properties of a recorded signal data track vary with cross-track location with SMR. In Shingled Magnetic Recording (SMR), the location of the track center of the signal for a shingled track depends on the frequency-component observed. High frequency components are displaced in the shingling direction while low frequency components are displaced in the opposite direction. This has been observed with square wave signals and components of pseudo-random patterns that represent stored data.

Referring to FIG. 5, the example signals 500 include a normalized low frequency signal, indicated by diamonds labeled 350 kfci, a normalized mid frequency signal, indicated by rectangles labeled 750 kfci, and a normalized high frequency signal, indicated by triangles labeled 1574 kfci. The normalized signals are shown relative to a vertical axis in arbitrary units relative to cross-track position in nano-meters (nm) shown relative to a horizontal axis. The frequency signal profiles are normalized to their peak value so that their widths and positions can be easily compared. FIG. 5 contains data from 2 shingling experiments where the location of the shingling track is towards the ID (right side of track is shingled) for the 3 profiles to the left or towards the OD (left side of track is shingled) for the 3 profiles to the right.

Referring also to FIG. 6, the example signal shift 600 includes a fractional amount shown relative to a vertical axis relative to positive and negative read offset in nano-meters (nm) shown relative to a horizontal axis with lines representing jitter, electrical, and colored noise signals.

As shown in FIG. 5 the outermost edges of the profiles are the tracks as written magnetically with the inside edges having being created by the shingling method. That low frequency tracks are written wider is clear from the outside edges low frequency signal curves, indicated by diamonds are wider than the mid frequency signal curves, indicated by rectangles which is in turn wider than the high frequency signal curves, indicated by triangles. Looking at the inside track edges, one sees that the edges of the lower frequency tracks are also displaced in the shingle writing, with the low frequency track edge being shifted in the direction opposite to the shingling. This phenomenon at the shingled track edge amplifies the relative displacement of the different frequency tracks in SMR drive 104.

The result is that the peaks of the signal frequencies are shifted significantly with respect to each other in the SMR drive 104. The 2 data sets shown in FIG. 5 show that this shift is asymmetric and the direction of the asymmetry depends on the shingling direction information that is known during the operation of the SMR drive 104. As well as the signal mix varying with cross-track position, the noise mix also varies with cross-track position in SMR as shown in FIG. 6.

Due to vibrations in drives 104, the data track may be read back with the head displaced from the center of the track. As shown in FIGS. 5 and 6, the relative strength of the signals of different frequency and noise mix change due to their cross track displacement. The relative change of component signal and noise strengths as a function of cross track position and the known cross track position when reading a signal can be used to improve the optimization for the data recovery channel's signal analysis.

Sector servo typically is used in HDDs 104. Several hundred radial wedges of servo information are placed uniformly around the disk 126 on each surface 124. The storage device system 104 multiplexes between reading short bursts of servo position information and reading or writing data.

In accordance with features of the embodiments of the invention, during read operations, the information from the servo sectors advantageously is enhanced by information from the data track itself. This additional information is especially valuable since it is derived from the actual written track rather than the servo-sectors that the written track was trying to align itself with. This information also is especially valuable in an error-recovery mode where this additional information can indicate whether the written tracks have likely been displaced from their ideal locations.

In embodiments of the invention, from the servo fields, the hard drive electronics can control the track centering of the read head over the user data track. Varying the cross-track position of the readback head over the data track results in different mixes of signal powers. The data recovery channel advantageously uses this information to improve the analysis of the readback signals for enhanced data recovery.

Figure 7:
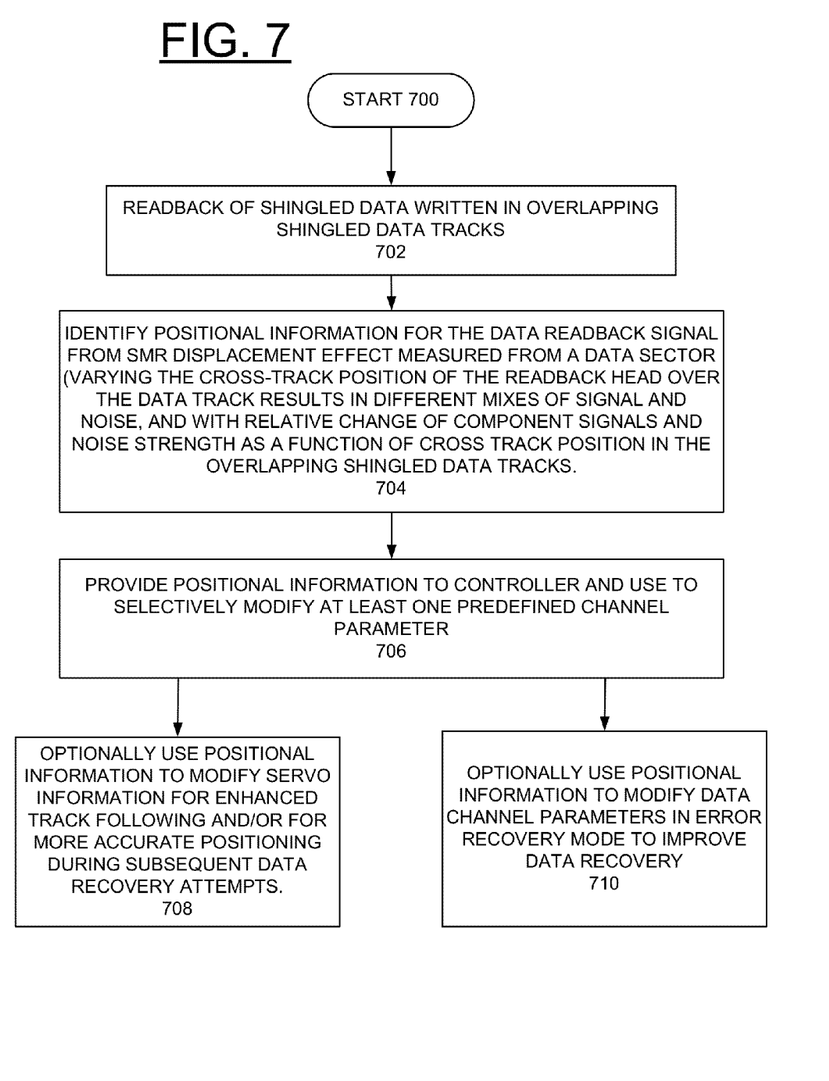
FIG. 7 is a flow chart illustrating example operations of the system of FIG. 1 in accordance with embodiments of the invention.

Referring now to FIG. 7, there is shown a flow chart illustrating example operations of the system 100 of FIG. 1 in accordance with embodiments of the invention. In FIG. 7, example operations, for example, performed by controller 114, start as indicated at a block 700 with readback of shingled data written in overlapping shingled data tracks as indicated at a block 702.

Positional information is identified for the data readback from SMR displacement effect measured from a data sector as indicated at a block 704. As shown at block 704, varying the cross-track position of the readback head over the data track results in different mixes of signal and noise and with relative change of component signals and noise strength as a function of cross track position in the overlapping shingled data tracks.

As indicated at a block 706, the positional information is provided to the controller and are used to selectively modify at least one predefined channel parameter.

For example, as indicated at a block 708, the positional information optionally are used to modify servo information for enhanced track following and/or for more accurate positioning during subsequent data recovery attempts. For example, as indicated at a block 710, the positional information optionally are used to modify data channel parameters in error recovery mode for enhanced data recovery. Example channel parameters that could be modified include equalization parameters and noise predictive parameters.

Figure 8:
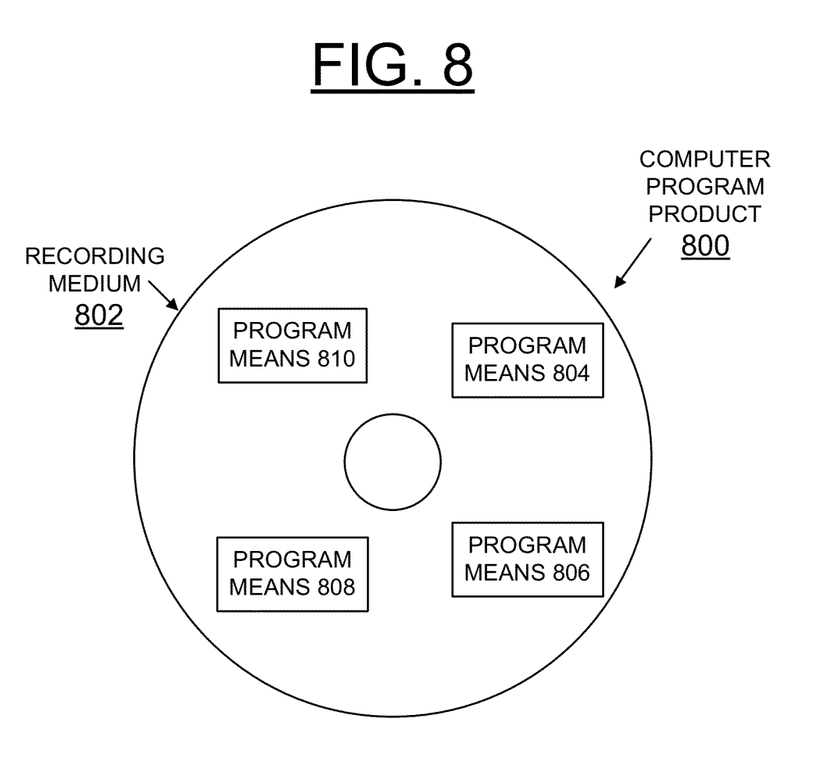
FIG. 8 is a block diagram illustrating a computer program product in accordance with embodiments of the invention.

Referring now to FIG. 8, an article of manufacture or a computer program product 800 of the invention is illustrated. The computer program product 800 includes a computer readable recording medium 802, such as, a floppy disk, a high capacity read only memory in the form of an optically read compact disk or CD-ROM, a tape, or another similar computer program product. Computer readable recording medium 802 stores program means or control code 804, 806, 808, 810 on the medium 802 for carrying out the methods for implementing enhanced track following and data recovery with readback of shingled data written in overlapping shingled data tracks of the embodiments of the invention in the system 100 of FIG. 1.

A sequence of program instructions or a logical assembly of one or more interrelated modules defined by the recorded program means or control code 804, 806, 808, 810, direct the system 100 for implementing enhanced track following and data recovery of the embodiments of the invention.

While the present invention has been described with reference to the details of the embodiments of the invention shown in the drawing, these details are not intended to limit the scope of the invention as claimed in the appended claims.

What is claimed is:

1. A method for implementing enhanced data readback of shingled data written in overlapping shingled data tracks on a recordable surface of a storage device comprising:

identifying positional information by processing a data readback signal of the shingled data with said data readback signal being asymmetric about a shingled track center and said shingled track center varying based upon signal frequency components and identifying positional information by varying a cross-track position of a readback head over the shingled data track; and using said identified positional information to selectively modify at least one predefined channel parameter.

2. The method as recited in claim 1 wherein processing said data readback signal of the shingled data includes identifying positional information from a signal mix varying with said cross-track position in the overlapping shingled data tracks.

3. The method as recited in claim 1 wherein processing said data readback signal of the shingled data includes identifying positional information from a noise mix varying with said cross-track position in the overlapping shingled data tracks.

4. The method as recited in claim 1 wherein processing said data readback signal of the shingled data includes identifying positional information from a relative change of component signal and noise strengths as a function of said cross track position in the overlapping shingled data tracks.

5. The method as recited in claim 1 wherein using said identified positional information to selectively modify at least one predefined channel parameter includes using said identified positional information to selectively modify at least one predefined servo channel parameter for selectively modifying servo information with said identified positional information.

6. The method as recited in claim 5 includes using said selectively modified servo information with said identified positional information for enhanced track following.

7. The method as recited in claim 1 wherein using said identified positional information to selectively modify at least one predefined channel parameter includes using said identified positional information in an error recovery mode to selectively modify at least one predefined data recovery channel parameter.

8. The method as recited in claim 1 includes wherein using said identified positional information to selectively modify at least one predefined channel parameter includes using said identified positional information to selectively modify at least one predefined data recovery channel parameter.

9. The method as recited in claim 1 wherein using said identified positional information to selectively modify at least one predefined channel parameter includes using said selectively modified predefined data recovery channel parameter to enhance data recovery.

10. An apparatus for implementing enhanced data readback of shingled data written in overlapping shingled data tracks on a recordable surface of a storage device comprising:
   the recordable surface of the storage device including a plurality of shingled data tracks;
   a controller identifying positional information by processing a data readback signal of the shingled data with said data readback signal being asymmetric about a shingled track center and said shingled track center varying based upon signal frequency components and identifying positional information by varying a cross-track position of a readback head over the shingled data track; and
   said controller using said identified positional information to selectively modify at least one predefined channel parameter.

11. The apparatus as recited in claim 10 includes control code stored on a computer readable medium, and wherein said controller uses said control code for implementing data readback of shingled data.

12. The apparatus as recited in claim 10, wherein said controller processing said data readback signal of the shingled data includes said controller identifying positional information from signal mix varying with said cross-track position in the overlapping shingled data tracks.

13. The apparatus as recited in claim 10, wherein said controller processing said data readback signal of the shingled data includes said controller identifying positional information from noise mix varying with said cross-track position in the overlapping shingled data tracks.

14. The apparatus as recited in claim 10, wherein said controller processing said data readback signal of the shingled data includes said controller identifying positional information from a relative change of component signal and noise strengths as a function of said cross track position in the overlapping shingled data tracks.

15. The apparatus as recited in claim 10, wherein said controller using said identified positional information to selectively modify at least one predefined channel parameter includes said controller selectively modifying servo information with said identified positional information for enhanced track following.

16. The apparatus as recited in claim 10, wherein said controller using said identified positional information to selectively modify at least one predefined channel parameter includes said controller using said identified positional information to selectively modify at least one predefined data recovery channel parameter for enhanced data recovery.

17. A data storage device comprising:
   at least one disk; said disk including a recordable surface;
   said recordable surface including a plurality of zones; each said zone including a plurality of overlapping data tracks;
   a controller identifying positional information by processing a data readback signal of the shingled data with said data readback signal being asymmetric about a shingled track center and said shingled track center varying based upon signal frequency components and identifying positional information by varying a cross-track position of a readback head over the shingled data track; and
   said controller using said identified positional information to selectively modify at least one predefined channel parameter.

18. The data storage device as recited in claim 17, wherein said controller processing a data readback signal of the shingled data includes said controller identifying positional information from a relative change of component signal and noise strengths as a function of said cross track position in the overlapping shingled data tracks.

19. The data storage device as recited in claim 17, wherein said controller using said identified positional information to selectively modify at least one predefined channel parameter includes said controller using said identified positional information to selectively modify at least one predefined servo channel parameter for selectively modifying servo information with said identified positional information for enhanced track following.

20. The data storage device as recited in claim 17, wherein said controller using said identified positional information to selectively modify at least one predefined channel parameter includes said controller using said identified positional information to selectively modify at least one predefined data recovery channel parameter for enhanced data recovery.

* * * * *